United States Patent
Johnston et al.

[15] 3,681,509
[45] Aug. 1, 1972

[54] BUS BAR ELECTRIC POWER DISTRIBUTION SYSTEM WITH HEAT PIPE HEAT DISSIPATING MEANS

[72] Inventors: Frank C. Johnston; Werner A. Krause, both of Cincinnati, Ohio

[73] Assignee: General Electric Company

[22] Filed: June 28, 1971

[21] Appl. No.: 157,546

[52] U.S. Cl.................................174/16 B, 174/15 C, 174/99 B, 165/105
[51] Int. Cl..............................................H01b 7/34
[58] Field of Search........174/15 R, 15 C, 99 B, 16 B; 165/105

[56] References Cited

UNITED STATES PATENTS

| | | | |
|---|---|---|---|
| 3,609,206 | 9/1971 | McConnell | 174/16 B |
| 3,541,487 | 11/1970 | Leonard | 174/15 R |
| 3,347,975 | 10/1967 | Shannon | 174/16 B |
| 3,627,899 | 12/1971 | Moore | 174/15 BH |

*Primary Examiner*—Lewis H. Myers
*Assistant Examiner*—A. T. Grimley
*Attorney*—Robert T. Casey et al.

[57] ABSTRACT

Enclosed multi-phase power bus bar distribution apparatus made up of prefabricated ten-foot lengths or sections having joints which include closely stacked overlapping bus bar portions. Heat generated in the joint is led out of the joint by conductive heat-bleeding members which extend into close thermal contact with at least one bus bar of each phase at the overlapped portions. "Heat pipe" heat conducting members are provided in close thermal contact with portions of the heat-bleeding members and in close thermal contact with a heat-dissipating plate which dissipates heat to the ambient air. Fins are added to the heat-dissipating plate to enhance its heat dissipating ability. In another form, heat-bleeding members extend into close thermal contact with each of the bus bars of a prefabricated section intermediate the ends of the bus bars and "heat pipes" lead heat to a heat-dissipating cap plate. The heat-bleeding members and heat-pipe members are staggered or spaced along the length of the section.

The "heat pipes" comprise elongated generally tubular, hermetically sealed enclosures, which have controlled low pressure therein. A vaporizable liquid is included which is vaporized by contact with a high temperature portion of the enclosure and is recondensed by contact with a cooler portion of the enclosure. A capillary-acting "wick" serves to return the recondensed liquid from the cooler portion to the hotter portion, thereby completing a cycle which continues to transfer heat from the hotter portion to the cooler portion.

16 Claims, 4 Drawing Figures

PATENTED AUG 1 1972　　　　　　　　　　3,681,509

INVENTORS
FRANK C. JOHNSTON
WERNER A. KRAUSE

BY Robert F. Casey
ATTORNEY

BUS BAR ELECTRIC POWER DISTRIBUTION SYSTEM WITH HEAT PIPE HEAT DISSIPATING MEANS

FIELD OF THE INVENTION

The present invention relates to electric bus bar power distribution systems, and particularly to such power distribution systems which are made up of prefabricated elongated lengths or sections, such as ten-foot sections, having bus bars in closely side-by-side stacked arrangement in insulated relation in a metallic outer housing. The lengths or sections are interconnected at joints with bus bars of the connected sections in overlapping relation or with splice plates overlapping end portions of the respective bus bars. Connecting pressure is applied by bolt means, such as by a single insulated through-bolt or by a single clamping bolt forcing a pressure plate against a side of the joint assembly.

DESCRIPTION OF THE PRIOR ART

Bus bar type electric power distribution systems have been in use for many years. One class of bus bar electric power distribution systems which have found wide acceptance in industry comprise systems made up of prefabricated elongated lengths of bus bars in a metallic housing, the lengths being connected together to form a bus bar power distribution system or "busway". Among the advantages of such prefabricated systems are standardization of manufacture and accompanying ease of ordering and installation. In addition, such prefabricated bus bar electric power distribution systems have the advantage over custom-built bus bar power distribution systems and over cable in that as need arises, such systems may be dismantled and relocated with a minimum of difficulty. Such bus bar systems or busways are commonly utilized in large industrial or commercial buildings for carrying power from an incoming switchboard to remote locations in the building.

With the greatly increased usage of electric power, and increasing limitations of space in industrial and commercial buildings, there has been a continuing effort to reduce the size and/or to increase the current-carrying capacity of such systems, with particular regard to their cross-sectional area and amount of conductive material such as copper or aluminum used. A primary difficulty in achieving reduction of size and/or increase of current-carrying capacity has been the dissipation of heat generated in the bus bars. Thus, while the electrical resistance of such bus bars is very low, the high amounts of current carried thereby cause appreciable heat to be generated in the bus bars. Particular reference is had in this connection to busway systems carrying over 100 amperes, such as systems carrying from 400 to 2,000 or more amperes.

A significant restriction on designs of such busway systems is that the temperature measured on the hot spot of current carrying members of the busway systems shall not exceed 55° centigrade above the temperature of normal ambient air.

Early designs of busway systems included bus bars supported in spaced side-by-side relation by separate insulating means spaced along the length of the bus bars, and with a substantial space between the bus bars and the outer metallic housing or duct. An example of such busway power systems is shown in U.S. Pat. No. 2,468,614 to E. T. Carlson issued Apr. 26, 1949 and assigned by mesne assignments to the same assignee as present invention.

An improved form of bus bar power distribution system is disclosed in U.S. Pat. No. 3,018,320 to R. N. Rowe, issued Jan. 23, 1962, and assigned to the same assignee as the present invention, heat dissipation from the bus bars to the outer metallic housing and, therefore, to the surrounding ambient air, is greatly improved by placing the bus bars in intimate thermal contact with the outer housing, with only a thin layer of insulating material between the bus bars and the housing.

In a still later U.S. Pat. No. 3,384,702 issued to C. M. Stevens on May 21, 1968 and assigned to the same assignee as the present invention, further improvement in the heat dissipation from the bus bars to the surrounding housing and from the housing to the ambient air is accomplished by not only placing the bus bars close together with relatively thin electrical insulating means between the bus bars for the purpose of reducing the reactance of the system, but also placing the opposite edge portions of all of such bus bars in intimate thermal contact with a housing member and by extending portions of the housing in a manner comparable to fins by providing the metallic housing with substantial extended portions exposed to the ambient air. The housing was also brought into intimate thermal contact with outer side walls of the outer bus bars of the closely stacked array of bus bars. These measures greatly increased the heat dissipation from the bus bars to the ambient air, as well as reducing the reactance of the system.

The most troublesome point as regards temperature rise in such a prefabricated bus bar electric power distribution system is at the joints connecting each prefabricated elongated length or section to the next succeeding one. This is because of the electrical resistance always encountered in connecting electrical conductors generally, and particularly in connecting electrical bus bars to other electrical bus bars by disconnectable pressure means.

In recent years, in areas of technological development quite removed from electric power distribution, a new instrumentality has been developed for conducting heat from one location to another. This instrumentality has become known by the simplified name of the "heat pipe".

The structure and operation of such "heat pipes" will be discussed more particularly hereinafter. The following reference, however, may be consulted as to the theory, structure, and operation of such heat pipes:

"How Heat Pipes Work", D. B Dallas,

ASTME Vectors, 1968/3.

It is a general object of the invention to provide a bus bar electric power distribution system, and particularly a prefabricated bus bar electric power distribution system, which has greatly improved heat dissipation means from the electric power bus bars to the ambient atmosphere, thereby permitting a reduction in size or cross-section of conductive material required for a given nominal current-carrying capacity, or conversely, to permit the carrying of substantially increased amounts of electric current in bus bar conductors of a given crosslsectional size, without undue temperature rise.

It is a more particular object of the invention to provide a bus bar type electric power distribution system, and particularly a prefabricated bus bar electric power distribution system which has improved thermal dissipating means utilizing the "heat pipe" principle.

It is another object of the invention to provide a bus bar electric power distribution system of the type described which achieves such improved thermal dissipation without significantly increasing the cross-sectional area of the busway sections or lengths.

It is a further object of the invention to provide an electric bus bar distribution system of the type described which includes means for drawing heat, not only from the outer bus bars of a closely stacked array of bus bars, but also from the intermediate bus bars by means other than simple close thermal contact of the edges of such intermediate bus bars with a housing member.

It is another object of the invention to provide such an improved bus bar electric power distribution system which utilizes the "heat pipe" principle, but which also utilizes housing structures and insulating structures incorporating other heat dissipating means as generally described above whereby to optimize overall heat dissipation.

It is a further object of the invention to provide an electric bus bar power distribution system of the type described utilizing a heat pipe thermal conducting means which shall have optimum thermal contact which includes simple but effective electrical insulating means for insulating the bus bars from each other and from the outer metallic housing without detracting from dissipation of heat from such bus bars.

SUMMARY OF THE INVENTION

Two forms of the invention are disclosed in accordance with the invention, one of which is particularly suitable for use at joints between adjacent prefabricated busway sections. A second form is disclosed which is particularly suitable for use at an intermediate point of a busway section, without increasing the cross-sectional area of the busway section significantly. It will be understood, however, that the disclosed invention, in either of the aforesaid two forms, may be used at either joints or at intermediate portions of busway sections and may, in fact, be utilized with busway systems which are not prefabricated.

In accordance with the invention in the first form, generally flat plate-like heat conducting members of high heat-conducting material, such as copper or aluminum, are placed in direct contact with a side surface of one or more of the bus bars at the joint location. The heat-conducting plate members are extended above the edge of the bus bars, and have a right-angle extending portion, to which one end of a heat pipe thermal conducting member is secured in close thermal conducting relation, such as by welding. This is repeated for each joint location of each pair of bus bar ends forming the busway length joint.

In order to provide optimum thermal dissipation from the other ends of such heat pipe heat conducting members, a heat dissipating plate member is provided.

The heat pipes are brought through openings in a wall of the main housing of the busway joint, and are secured to the heat-dissipating plate, which extends parallel to and spaced away from the corresponding surface of the busway joint. In the alternative, the upper ends of the heat pipe thermal conducting members may be brought into contact with the main joint cover member instead of using a separate heat dissipating member. Ordinarily, however, better thermal contact can be achieved with a separate heat dissipating plate, since the usual joint cover serves other purposes and is usually bolted in place and is therefore not free to adapt itself to close thermal contact with such heat pipe ends.

In the second form of the invention, generally L-shaped members of high thermal conductivity, such as copper or aluminum, are welded to the upper edge of each of the bus bars at locations intermediate to the ends of the bus bars. A heat pipe thermal conducting member is placed in intimate thermal contact with the bent-over portion of each of such L-shaped members, such as by welding, and at its upper end is brought into intimate thermal contact with a heat-dissipating plate outside of the busway housing. The L-shaped members and corresponding heat pipe members for each phase of a multiphase busway system in this form are staggered or offset along the length of the busway section so as to provide generous electrical over-surface and through-air electrical clearance. In contrast, in the form applied to the busway joint, the heat pipe members are in a row extending transversely of the general direction of the busway length. This is possible, because of the slightly increased width of the joint as compared to the width of the busway section at intermediate locations and because of electrical insulating coating of the parts, in a manner to be described.

DESCRIPTION OF A PREFERRED EMBODIMENT

Figure 1:
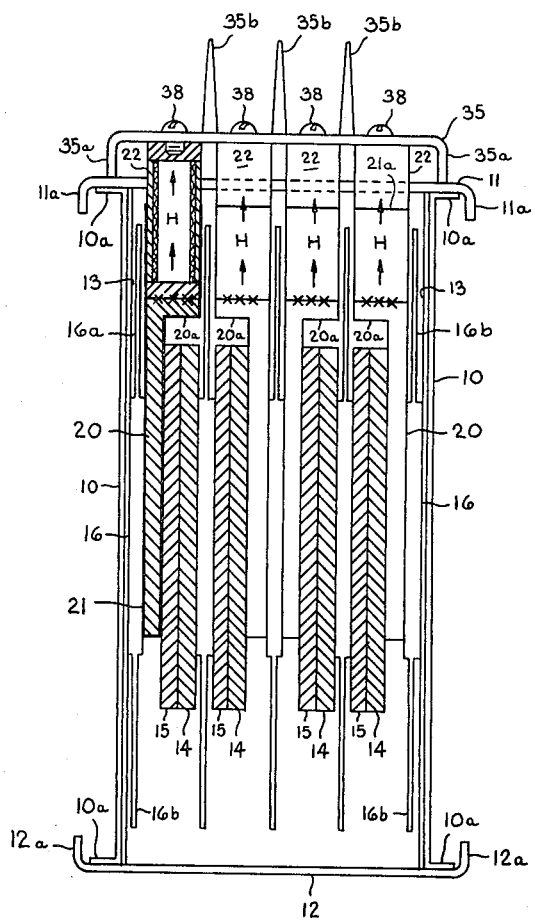
FIG. 1 is a cross-sectional view of a joint portion of a prefabricated bus bar electric power distribution system incorporating the invention.

Referring to FIG. 1, the invention is shown as applied to a joint portion of a prefabricated electric bus bar power distribution system generally of the type shown in the above mentioned U.S. Pat. No. 3,384,702 issued to C. M. Stevens. A description of the joint housing construction, including the joint clamping means, not shown, is set forth in U.S. Pat. No. 3,365,537 issued Jan. 23, 1968 to J. A. Fehr, Sr., et. al., and assigned to the same assignee as the present invention.

The busway joint includes a generally rectangular metallic outer housing, including two opposed generally planar metallic side members, 10, having outwardly-turned flange portions 10A at the upper and lower edges thereof. The side members 10 are interconnected by top and bottom joint cover members 11 and 12 respectively, each having right angle flange portions 11A and 12A respectively. The flange portions 10A of the side members 10 are connected to the top and bottom cover members 11 and 12 by suitable means such as by welding, or by bolts, now shown. Opposed side splice plates 13 are included which are positioned at the inner side surfaces of the side members 10.

The joint assembly further includes a first set of four bus bar end portions 14 comprising end portions of bus bars carried by a first busway section. A second set of four bus bar end portions 15 are also included, which are in overlapping side-by-side engagement with corresponding ones of the bus bar end portions 14, as shown. The bus bar end portions 15 comprise portions of bus bars supported in and forming part of a second busway section connected to the first busway section. Insulating spacer members 16, four in number, are also provided for electrically insulating and mechanically spacing the overlapped pairs of bus bar end portions, 14, 15. The insulating spacer members 16 have oppositely extending reduced-thickness portions 16A and 16B.

In accordance with the invention, heat conducting and dissipating means is provided for conducting heat away from the overlapped bus bar end portions 14, 15, to the exterior ambient atmosphere. This heat conducting means includes, for each overlapped pair of bus bar end portions, a generally plate-like heat conducting member 20 of metallic material, such as copper or aluminum. Each of the heat conducting members 20 has a right-angle extending bent-over portion 20A.

Also in accordance with the invention, a plurality of "heat pipe" members 22 are provided, there being at least one such heat pipe for each of the heat conducting members 20. Each of the heat pipe members 22 is connected in optimum thermal conducting relation to the right-angle extending portion 20A of a corresponding heat conducting member 20, by a suitable means, such as by welding.

Figure 2:
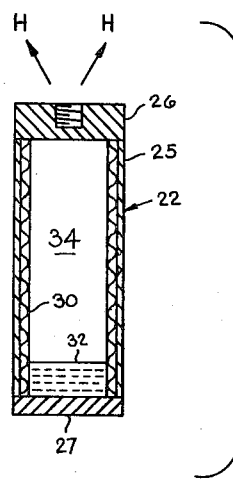
FIG. 2 is a sectional view of one of the heat pipe heat conducting members used in the form of FIG. 1.

Referring to FIG. 2, the construction of the heat pipe members 22 is shown.

Each of the heat pipe members 22 includes a generally tubular housing 25 having metallic end portions 26 and 27. The housing 25 is hermetically sealed, and the pressure within the housing 25 is controlled to a desired low pressure. A suitable liquid, such, for instance, as water is included in each heat pipe member 22. As shown in FIG. 2, a lining 30 which is generally cylindrical, is provided within the housing 25. The lining 30 in 25 is of a suitable material to conduct liquid by capillary action, such as woven metal matting, etc.

In operation, heat conducted to the bottom plate 27 of the heat pipe member 22 from the corresponding bus bar to the heat conducting member 20 raises the temperature of the liquid 32 to the point where it vaporizes, filling the inner chamber 34 of the housing 25. As the liquid vaporizes, it absorbs a large amount of heat, known as the heat of vaporization. The vapor comes in contact with the opposite end member 26 of the heat pipe 22, which is in good thermal conducting relation with a heat dissipating member 35. The heat dissipating member 35 is a generally rectangular metallic plate, having downwardly turned flanges 35A along each side. The heat dissipating plate 35 is attached to the end plates 26 of the heat pipes 22 by suitable means, such as by bolts 38. Since the end member 26 is at lower temperature than the vapor filling the chamber 34, the vapor 34 condenses when it comes in contact with the plate 26, giving up a large amount of heat, known as the heat of condensation. The condensed liquid is conducted by the liquid conducting liner member 30, back to the original location i.e., bottom plate 27. This provides a rapid and highly effective heat transfer means for transferring heat from the interior of the busway to the exterior ambient air.

For the purpose of improving the heat dissipating ability of the plate member 35, elongated fin members 35B are provided which are in good thermal conducting relation with the plate 35.

Each of the heat conducting members 20 and its associated heat pipe member 22 are coated at the outer surfaces thereof by suitable thin tough coating 21 of insulating material, such, for instance, as by a coating of epoxy material applied by the heating of the heat conducting member to a predetermined elevated temperature and immersing it in a container filled with the insulating material in powdered form, causing the material to fuse and form a homogeneous tough coating thereon when the part is withdrawn and allowed to cool. A more detailed description of the type of insulating material and its method of application may be found in U.S. Pat. No. 2,844,489 Gemmer, July 22, 1958 and No. 2,974,059 Gemmer, Mar. 7, 1961. The insulating coating 21 is applied, in the form shown, up to the line 21A to permit optimum heat transfer by metal to metal contact between the upper ends of the heat pipe members 22 with the plate 35. If desired, however, the entire heat pipe and heat conducting member assembly may be coated with such insulation.

Figure 3:
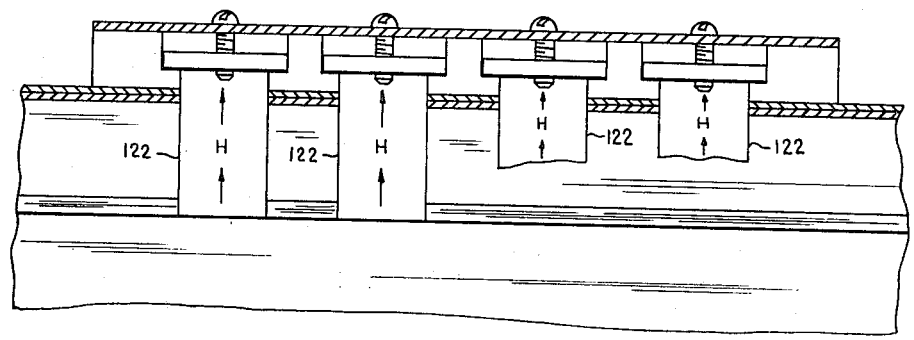
FIG. 3 is a side elevational view, partially in section, of an intermediate portion of a prefabricated busway section incorporating the invention.
Figure 4:
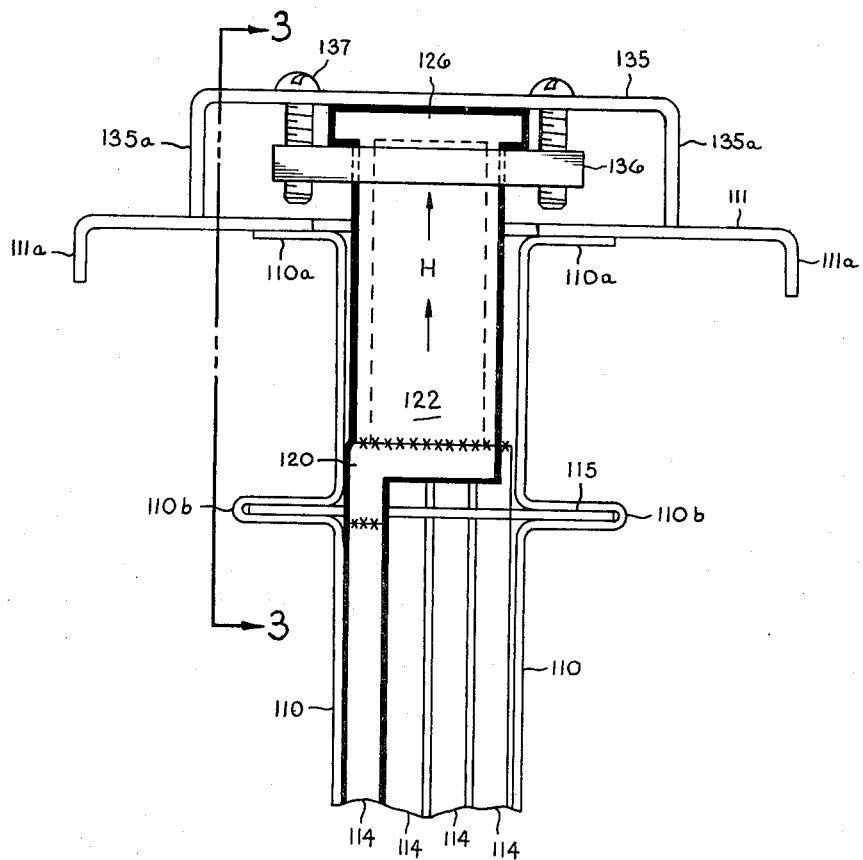
FIG. 4 is a fragmentary sectional view taken substantially on the line 4—4 of FIG. 3.

Referring to FIGS. 3 and 4, the invention is shown in another embodiment particularly suitable for dissipating heat from an intermediate portion of a busway length or section such as a busway of the type shown in the aforesaid issued Stevens patent. The busway housing includes opposed metallic side members 110 having outwardly turned flanges 110A at the upper and lower edges (only the upper flanges being shown). The flanges 110A are connected in any suitable manner, such as by welding, to top and bottom cover members 111 (only the top cover member being shown), having right angle flange portions of 111A at its opposite edges.

A plurality, such as four, electrical conducting bus bars 114 are supported in close, side-by-side insulated relation within the housing. The bus bars 114 may be of any suitable conducting materials such as copper or aluminum. As in the aforesaid Stevens patent, the sidewalls 110 of the housing include intermediate outwardly offset portions 110B which serve to trap a flat elongated tie plate member 115 for the purpose of interconnecting the opposed side wall members 110 and holding them in close thermal contact with the bus bars 114, and pressing the bus bars 114 into close side-by-side thermal contact, as described in the aforesaid U.S. Pat. No. 3,384,702. In addition, such tie-plates serve to conduct heat from edge portions of the bus bars to the main housing.

For the purpose of further bleeding heat from the bus bars 114, each of the bus bars has attached to its edge portion a generally L-shaped heat conducting member 120 attached to the corresponding bus bar by suitable means, such as by welding. The tie plate 115 has an interrupted portion or opening therein, to permit the passage of the heat conducting members 120.

For the purpose of conducting heat from each of the heat conducting members 120 to a remote location where it may be more easily dissipated, a heat pipe heat conducting member 122 is provided, for each of the heat conducting members 120, which may be of the same general characteristics as that described in connection with FIGS. 1 and 2. The heat pipe members 122 are attached to the generally horizontal upper surfaces of the corresponding heat conducting members 120 by suitable means, such as by welding. Each heat pipe member extends through an opening or spacing in the top cover member 111A, and has its upper end plate portion 126 in close thermal contact with a heat dissipating plate 135. The heat dissipating plate 135 is spaced from the corresponding member cover member 111, and has downwardly bent end flange portions 135A which engage the corresponding surface of the cover member 111. The heat dissipating plate member 135 is preferably channel shaped, and has its opposite ends open, to facilitate the flow of air therethrough between it and the cover member 111.

For the purpose of holding the upper ends of the heat pipe members 122 in close thermal engagement with the heat dissipating plate 135, a clamping plate 136 is provided for each of the heat pipes, having tapped holes therein, which receive clamping bolts 137 extending through the heat dissipating plate 135 and into threaded engagement with the plate 136.

As shown particularly in FIG. 3, the heat pipe members 122 are preferably spaced longitudinally along the length of the busway in "staggered" relation, to provide generous electrical clearance between heat pipe members connected to the different bus bars.

As indicated by the heavy line in FIG. 4, each of the heat pipe members 122 and its associated heat conducting member 120, and bus bar 114, are coated with a continuous coating of tough insulating material, such as a fused powder coating. This serves to insulate the corresponding bus bars 114, their heat conducting members 120 and the heat pipe members 122, from each other and from the housing, while permitting close thermal contact with adjacent metallic members.

While I have shown, in FIGS. 1, 3 and 4, only one heat pipe member for each of the heat conducting members, it is contemplated by the invention, that the heat conducting members 20 and 120 may be elongated in the direction of the length of the bus bars, and two or more heat pipe members may be utilized in connection therewith, operating effectively in parallel.

While only two specific embodiments of the invention have been shown and described, it will be apparent that many modifications may be made. It is therefore intended, by the appended claims, to cover all such modifications as fall within the true spirit and scope of the invention.

I claim:

1. An electric power distribution system comprising:
    a. at least one elongated electric power bus bar;
    b. enclosure means for said power bus bar;
    c. means supporting said electric power bus bar in said enclosure in electrically insulated relation;
    d. at least one elongated heat pipe heat conducting member;
    e. means supporting said heat pipe member with respect to said enclosure;
    f. each of said heat pipe members having a first end thereof in good thermal conducting contact with at least a portion of said electric power bus bar;
    g. said power distribution system including heat dissipating means in good thermal conducting relation with the other end of said heat pipe heat conducting member, whereby heat generated in said electric power bus bar is conducted to said one end of said heat pipe heat conducting member and is transferred by said heat pipe from said first end of said heat pipe heat conducting member said other end of said heat pipe conducting member and to said heat dissipating means, to dissipate said heat to the ambient atmosphere surrounding said power distribution system.

2. An electric power distribution system as set forth in claim 1 wherein said distribution system also includes a heat conducting member having a first portion in good heat conducting contact with said bus bar and having a second portion in good heat conducting relation with said one end of said heat pipe heat conducting member.

3. An electric power distribution system as set forth in claim 1 wherein said power distribution system includes a plurality of said power bus bars, there being at least one of said heat pipe heat conducting members for each of said power bus bars.

4. An electric power distribution system as set forth in claim 1 wherein said power distribution system includes a heat dissipating plate supported on said busway system enclosure externally thereof, each of said heat pipe members having its said other end in close heat conducting relation with said heat dissipating member.

5. An electric power distribution system as set forth in claim 1 wherein said enclosure includes an elongated, generally rectangular housing of metallic material having said bus bars supported in generally parallel, contacting side-by-side insulated relation in said housing.

6. An electric power distribution system as set forth in claim 4 wherein said heat dissipating member comprises a generally flat, thin, metallic plate-like member having a substantial external area thereof exposed to the ambient air, and wherein said heat dissipating member includes heat dissipating fins attached in good thermal conducting relation thereto.

7. An electric power bus bar distribution system joint comprising:
    a. a generally rectangular metallic housing;
    b. a plurality of pairs of overlapped electric power bus bars, each of said pairs of overlapped electric power bus bars being supported in insulated relation with respect to other of said pairs of overlapped bus bars;
    c. a high thermal conductivity heat conducting member for each of said overlapped electric power bus bars, said heat conducting member being in close thermal contact with a corresponding pair of said overlapped bus bars at their overlapped portions, each of said heat conducting members having a right-angle extending portion presenting a flat, generally planar surface;

d. an elongated heat pipe heat conducting member supported rigidly with respect to said metallic housing and having a first end portion in good thermal conducting relation to said planar surface of said heat conducting member.

8. An electric power busway joint as set forth in claim 7 wherein said heat conducting members comprise a first generally planar plate-like portion in direct side-by-side engagement with at least one of each of said overlapped bus bars; each of said heat conducting members having a portion spaced away from said overlapped bus bar portions and in good thermal contact relation with a corresponding one of said heat pipe heat conducting members at said spaced-away portion.

9. An electric power busway joint as set forth in claim 7 wherein said housing includes a cover member having opening means therein through which said heat pipe members pass; a heat dissipating plate supported on said housing externally thereof, each of said heat pipe conducting members having its other end in close thermal contact with said heat dissipating plate.

10. An electric power busway joint comprising:
a. a generally rectangular metallic housing;
b. a plurality of pairs of overlapped bus bar portions supported in said housing in insulated relation with other pairs of overlapped bus bar portions of said joint, said pairs of overlapped bus bar portions being supported substantially in alignment in a row between said opposed side wall portions of said joint housing, there being no unoccupied space between said overlapped bus bar portions and said insulating means and between said insulating means and said joint housing, and
c. means applying compressive pressure on said pairs of overlapped bus bar portions as a group, compressing them together in good electrical and thermal contact with each other;
d. a plurality of heat conducting members of metallic material in close side-by-side relation with each of said pairs of overlapped bus bar portions, said heat conducting members having portions extending beyond the edges of said overlapped bus bar portions;
e. a plurality of heat pipe heat conducting members; each of said heat pipe heat conducting members having one end thereof in good thermal contact with the said portion of said heat conducting members projecting beyond said edge portions of said overlapped bus bars.

11. An electric power busway joint as set forth in claim 10 wherein said heat conducting members each include a right-angle extending portion presenting a generally planar flat surface, said flat surface of said heat conducting members being in good thermal contact with a first end of a corresponding one of said heat pipe heat conducting members.

12. An electric power busway system comprising:
a. a plurality of elongated prefabricated busway sections, each of said sections including a generally rectangular metallic housing comprising opposed side wall members and opposed top and bottom wall members, and a plurality of electric power bus bars supported in closely spaced good thermal contact and electrically insulated contact with each other in said housing;
b. a plurality of heat conducting members of metallic material, each of said heat conducting members being in good thermal contact with at least a portion of each of said bus bars at a point intermediate the ends thereof;
c. said heat pipe heat conducting members each having a first end in good thermal conducting relation to said portion of said heat conducting members, respectively, and
d. heat dissipating means carried by said housing, each of said heat pipe heat conducting members having its other end in good heat conducting relation to said heat dissipating means.

13. Electric power busway system as set forth in claim 12 wherein said heat pipe heat conducting members are offset longitudinally of said busway to provide electrical clearance therebetween.

14. An electric power busway as set forth in claim 12 wherein said busway includes a heat dissipating plate supported on said housing externally thereof, said housing having openings therein through which said heat pipe members extend into close thermal contact with said heat dissipating plate.

15. An electric power busway joint as set forth in claim 14 wherein said busway includes clamping members engaging said other end of each of said heat pipe heat conducting members and clamping said other end of said heat pipe conducting members into good thermal contact relation with said external heat dissipating plate.

16. An electric power busway joint as set forth in claim 12 wherein said heat conducting members each comprise a generally L-shaped member of high heat thermal conductivity, and means attaching each of said heat conducting members to an edge portion of a corresponding one of said electric power bus bars.

* * * * *